United States Patent
Cideciyan et al.

(10) Patent No.: US 7,193,802 B2
(45) Date of Patent: Mar. 20, 2007

(54) APPARATUS FOR PROVIDING DYNAMIC EQUALIZER OPTIMIZATION

(75) Inventors: Roy D. Cideciyan, Rueschlikon (CH); Ajay Dholakia, Gattikon (CH); Evangelos S. Eleftheriou, Zurich (CH); Richard L. Galbraith, Rochester, MN (US); Weldon M. Hanson, Rochester, MN (US); Thomas Mittelholzer, Zurich (CH); Travis R. Oenning, Rochester, MN (US); Michael J. Ross, Rochester, MN (US); David J. Stanek, Rochester, MN (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 280 days.

(21) Appl. No.: 10/809,230

(22) Filed: Mar. 25, 2004

(65) Prior Publication Data

US 2005/0213241 A1  Sep. 29, 2005

(51) Int. Cl.
  *G11B 5/09* (2006.01)
  *G11B 5/035* (2006.01)
  *H03K 5/139* (2006.01)
(52) U.S. Cl. .......................... 360/65; 360/46; 375/232

(58) Field of Classification Search .................. None
  See application file for complete search history.

(56) References Cited

U.S. PATENT DOCUMENTS 5,060,088 A * 10/1991 Dolivo et al. ................ 360/46
5,999,355 A * 12/1999 Behrens et al. .............. 360/65
6,122,120 A *  9/2000 Shimoda ...................... 360/46
6,292,511 B1 * 9/2001 Goldston et al. ........... 375/235

* cited by examiner

*Primary Examiner*—William Korzuch
*Assistant Examiner*—Daniell L. Negrón
(74) *Attorney, Agent, or Firm*—David W. Lynch; Chambliss, Bahner & Stophel P.C.

(57) ABSTRACT

An apparatus for providing dynamic equalizer optimization is disclosed. The present invention solves the above-described problems by providing equalizer coefficient updates that converge towards the same solution as the direct method without having to first write a known pattern to the disk or requiring any prior knowledge of the data already written on the disk. The adaptive cosine function may be used to modify only a DFIR tap set, only the j and k parameters of a cosine equalizer or to modify both the tap set for a DFIR filter and the j and k parameters of the cosine equalizer. Another algorithm, such as the LMS algorithm, may be used to modify parameters not modified by the cosine algorithm.

32 Claims, 12 Drawing Sheets

APPARATUS FOR PROVIDING DYNAMIC EQUALIZER OPTIMIZATION

BACKGROUND OF THE INVENTION

1. Field of the Invention

This disclosure relates in general to data signal detection in a data channel, and more particularly to an apparatus for providing dynamic equalizer optimization.

2. Description of Related Art

As computer hardware and software technology continues to progress, the need for larger and faster mass storage devices for storing computer software and data continues to increase. Electronic databases and computer applications such as multimedia applications require large amounts of disk storage space.

Mass storage device manufacturers strive to produce high-speed hard disk drives with large data capacities at lower and lower costs. A high-speed hard disk drive is one that can store and retrieve data at a fast rate. One aspect of increasing disk drive speed and capacity is to improve or increase the areal density. Areal density may be increased by improving the method of storing and retrieving data.

In general, mass storage devices and systems, such as hard disk drives, include a magnetic storage media, such as rotating disks or platters, a spindle motor, read/write heads, an actuator, a pre-amplifier, a read channel, a write channel, a servo controller or digital signal processor, and control circuitry to control the operation of the hard disk drive and to properly interface the hard disk drive to a host or system bus. The read channel, write channel, servo controller, and a memory may all be implemented as one integrated circuit that is referred to as a data channel. The control circuitry often includes a microprocessor for executing control programs or instructions during the operation of the hard disk drive.

A hard disk drive performs write and read operations when storing and retrieving data. A typical hard disk drive performs a write operation by transferring data from a host interface to its control circuitry. The control circuitry then stores the data in a local dynamic random access memory. A control circuitry processor schedules a series of events to allow the information to be transferred to the disk platters through a write channel. The control circuitry moves the read/write heads to the appropriate track and locates the appropriate sector of the track. Finally, the hard disk drive control circuitry transfers the data from the dynamic random access memory to the located sector of the disk platter through the write channel. A sector generally has a fixed data storage allocation, typically 512 bytes of user data. A write clock controls the timing of a write operation in the write channel. The write channel may encode the data so that the data can be more reliably retrieved later.

In a read operation, the appropriate sector to be read is located by properly positioning the read head and data that has been previously written to the disk is read. The read/write head senses the changes in the magnetic flux of the disk platter and generates a corresponding analog read signal. The read channel receives the analog read signal, conditions the signal, and detects "zeros" and "ones" from the signal. The read channel conditions the signal by amplifying the signal to an appropriate level using automatic gain control (AGC) techniques. The read channel then filters the signal, to eliminate unwanted high frequency noise, equalizes the channel, detects "zeros" and "ones" from the signal, and formats the binary data for the control circuitry. The binary or digital data is then transferred from the read channel and is stored in the DRAM of the control circuitry. The processor then communicates to the host that data is ready to be transferred. A read clock controls the timing of a read operation in the read channel.

As the disk platters are moving, the read/write heads must align or stay on a particular track. This is accomplished by reading auxiliary information from the disk called a servo wedge. The servo wedge indicates the position of the heads both in a radial direction and along the circumference of a track. The data channel receives this position information so the servo controller can continue to properly position the heads on the track.

Traditional hard disk drive data or read channels used a technique known as peak detection for extracting or detecting digital information from the analog information stored on the magnetic media. In this technique, the waveform is level detected and if the waveform level is above a threshold during a sampling window, the data is considered a "one." More recently, advanced techniques utilizing discrete time signal processing to reconstruct the original data written to the disk are being used in read channel electronics to improve areal density. In these techniques, the data is synchronously sampled using a data recovery clock. The sample is then processed through a series of mathematical operations using signal-processing theory.

There are several types of synchronously sampled data channels. Partial response, maximum likelihood (PRML); extended PRML (EPRML); enhanced, extended PRML (EEPRML); fixed delay tree search (FDTS); and decision feedback equalization (DFE) are several examples of different types of synchronously sampled data channels using discrete time signal processing techniques. The maximum likelihood detection performed in many of these systems is usually performed by a Viterbi detector implementing the Viterbi algorithm.

The synchronously sampled data channel or read channel generally requires mixed-mode circuitry for performing a read operation. The circuitry may perform such functions as analog signal amplification, automatic gain control (AGC), continuous time filtering, signal sampling, discrete time signal processing manipulation, timing recovery, signal detection, and formatting. In all synchronously sampled data channels, the major goal during a read operation is to accurately retrieve the data with the lowest bit error rate in the highest noise environment.

One of the fundamental effects that limit the recording density in magnetic and optical recording systems is intersymbol interference (ISI). This effect is due to the bandlimited nature of the head/media combination and results in the overlap of responses due to sequentially recorded transitions on the media. That is, at a given instant in time, the output signal from the medium is composed of not only the response due to the input symbol at that instant, but also the responses from some previously recorded symbols. The amount and the span of this overlap increases as the linear recording density is increased, giving rise to overlap patterns among symbols that are generally very complex and difficult to unravel with a simple device.

Finite impulse response filtering may be used for equalizing received signals. For example, in order to reduce the intersymbol interference introduced by a communication channel, rather precise equalization may be provided using an adaptive filter. However, adaptive filters may also be used for noise cancellation, linear prediction, adaptive signal enhancement, and adaptive control.

Adaptive filters are digital filters that are capable of self-adjustment; and which are used in applications that require differing filter characteristics in response to variable signal conditions. An adaptive filter has the ability to update its coefficients. Coefficients to the adaptive filter are updated by sending new coefficients to the filter from a coefficient generator. The coefficient generator is an adaptive algorithm that modifies the coefficients in response to an incoming signal.

An important aspect of equalizer performance is its convergence. After any initial training period, the coefficients of an adaptive equalizer may be continually adjusted in a decision directed manner according to a suitable algorithm. In this mode, the error signal is derived from the final receiver estimate (not necessarily correct) of the transmitted sequence. In normal operation, the receiver decisions are correct with high probability, so that the error estimates are correct often enough to allow the adaptive equalizer to maintain precise equalization. Moreover, a decision directed adaptive equalizer can track slow variations in the channel characteristics or linear perturbations in the receiver front end, such as slow jitter in the sampler phase.

Thus, a suitable algorithm must be used for determining good equalizer taps describing the finite impulse response filter. A direct method for solving this problem is to write a known pattern to the disk, read the pattern back, deconvolve out the written pattern to obtain the system response, and then directly solve the resulting system of equations for the equalizer taps. This approach requires first writing a known pattern to the disk.

Another (well) known solution is the LMS (Least Mean Square) algorithm. The least mean square (LMS) error adaptive filtering scheme is described in B. Widrow and M. E. Hoff, Jr., "Adaptive Switching Circuits" in IRE Wescon Conv. Rec., Part 4, pp. 96–104, August 1960. The use of the LMS algorithm in an adaptive equalizer to reduce intersymbol interference is discussed in S. U. H. Qureshi, "Adaptive Equalization", Proc. IEEE, Vol. 73, No. 9, pp. 1349–1387, September 1987.

In an LMS equalizer, the equalizer filter coefficients are chosen to minimize the mean square error, i.e., the sum of squares of all the ISI terms plus the noise power at the output of the equalizer. Therefore, the LMS equalizer maximizes the signal-to-distortion ratio at its output within the constraints of the equalizer time span and the delay through the equalizer. Before regular data transmission begins, automatic synthesis of the LMS equalizer for unknown channels may be carried out during a training period. This generally involves the iterative solution of a set of simultaneous equations. During the training period, a known signal is transmitted and a synchronized version of the signal is generated in the receiver to acquire information about the channel characteristics. The training signal may consist of periodic isolated pulses or a continuous sequence with a broad, uniform spectrum such as a widely known maximum length shift register or pseudo-noise sequence. However, the convergence speed for the LMS equalizer is relatively low, and bandwidth will be consumed for the training sequence. Further, the LMS solution does not converge to the same solution as the direct method.

It can be seen then that there is a need for an apparatus for providing dynamic equalizer optimization.

SUMMARY OF THE INVENTION

To overcome the limitations in the prior art described above, and to overcome other limitations that will become apparent upon reading and understanding the present specification, the present invention discloses an apparatus for providing dynamic equalizer optimization.

The present invention solves the above-described problems by providing equalizer coefficient updates that converge towards the same solution as the direct method without having to first write a known pattern to the disk or requiring any prior knowledge of the data already written on the disk. The adaptive cosine function may be used to modify only a DFIR tap set, only the j and k parameters of a cosine equalizer or to modify both the tap set for a DFIR filter and the j and k parameters of the cosine equalizer. Another algorithm, such as the LMS algorithm, may be used to modify parameters not modified by the cosine algorithm.

A read channel in accordance with the principles of the present invention includes an equalizer configured to equalize a digital signal to provide equalized reproduced signals and a Viterbi detector capable of receiving the equalized reproduced signals and converting the reproduced signals into a digital output signal indicative of data stored on a recording medium, wherein the equalizer is implemented using a coefficient learning circuit that adaptively updates coefficients for the equalizer based upon a cosine function.

In another embodiment of the present invention, a waveform equalizer is provided. The waveform equalizer includes a delay element that delays a propagation of the reproduced signal, a plurality of multipliers that multiply predetermined coefficients by the reproduction signal and the delayed signal from the delay element, a coefficient learning circuit that adaptively updates the predetermined coefficients for each of the plurality of multipliers and an adder that adds outputs from the plurality of multipliers, wherein the coefficient learning circuit adaptively updates coefficients for the equalizer based upon a cosine function.

In another embodiment of the present invention, a signal processing system is provided. The signal processing system includes memory for storing data therein and a processor, coupled to the memory, for equalizing a digital signal to provide equalized reproduced signals, the processor adaptively updates coefficients for the equalizer based upon a cosine function.

In another embodiment of the present invention, a magnetic storage device is provided. The magnetic storage device includes a magnetic storage medium for recording data thereon, a motor for moving the magnetic storage medium, a head for reading and writing data on the magnetic storage medium, an actuator for positioning the head relative to the magnetic storage medium and a data channel for processing encoded signals on the magnetic storage medium, the data channel comprising an equalizer configured to equalize a digital signal to provide equalized reproduced signals and a Viterbi detector capable of receiving the equalized reproduced signals and converting the reproduced signals into a digital output signal indicative of data stored on a recording medium; wherein the equalizer is implemented using a coefficient learning circuit that adaptively updates coefficients for the equalizer based upon a cosine function.

In another embodiment of the present invention, another read channel is provided. This read channel includes means for equalizing a digital signal to provide equalized reproduced signals and means, coupled to the means for equalizing, for receiving the equalized reproduced signals and converting the reproduced signals into a digital output signal indicative of data stored on a recording medium, wherein the means for equalizing is implemented using means for adaptively updating coefficients for the means for equalizing based upon a cosine function.

In another embodiment of the present invention, another waveform equalizer is provided. This waveform equalizer includes means for delaying propagation of a reproduced signal, means for multiplying predetermined coefficients by the reproduced signal and the delayed signal from the means for delaying, means for adaptively updating the predetermined coefficients for the means for multiplying and means for adding outputs from the means for multiplying, wherein the means for adaptively updating the predetermined coefficients updates the predetermined coefficients based upon a cosine function.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides an apparatus for providing dynamic equalizer optimization. The present invention provides equalizer coefficient updates that converge towards the same solution as the direct method without having to first write a known pattern to the disk or requiring any prior knowledge of the data already written on the disk. The adaptive cosine function may be used to modify only a DFIR tap set, only the j and k parameters of a cosine equalizer or to modify both the tap set for a DFIR filter and the j and k parameters of the cosine equalizer. Another algorithm, such as the LMS algorithm, may be used to modify parameters not modified by the cosine algorithm.

Figure 1:
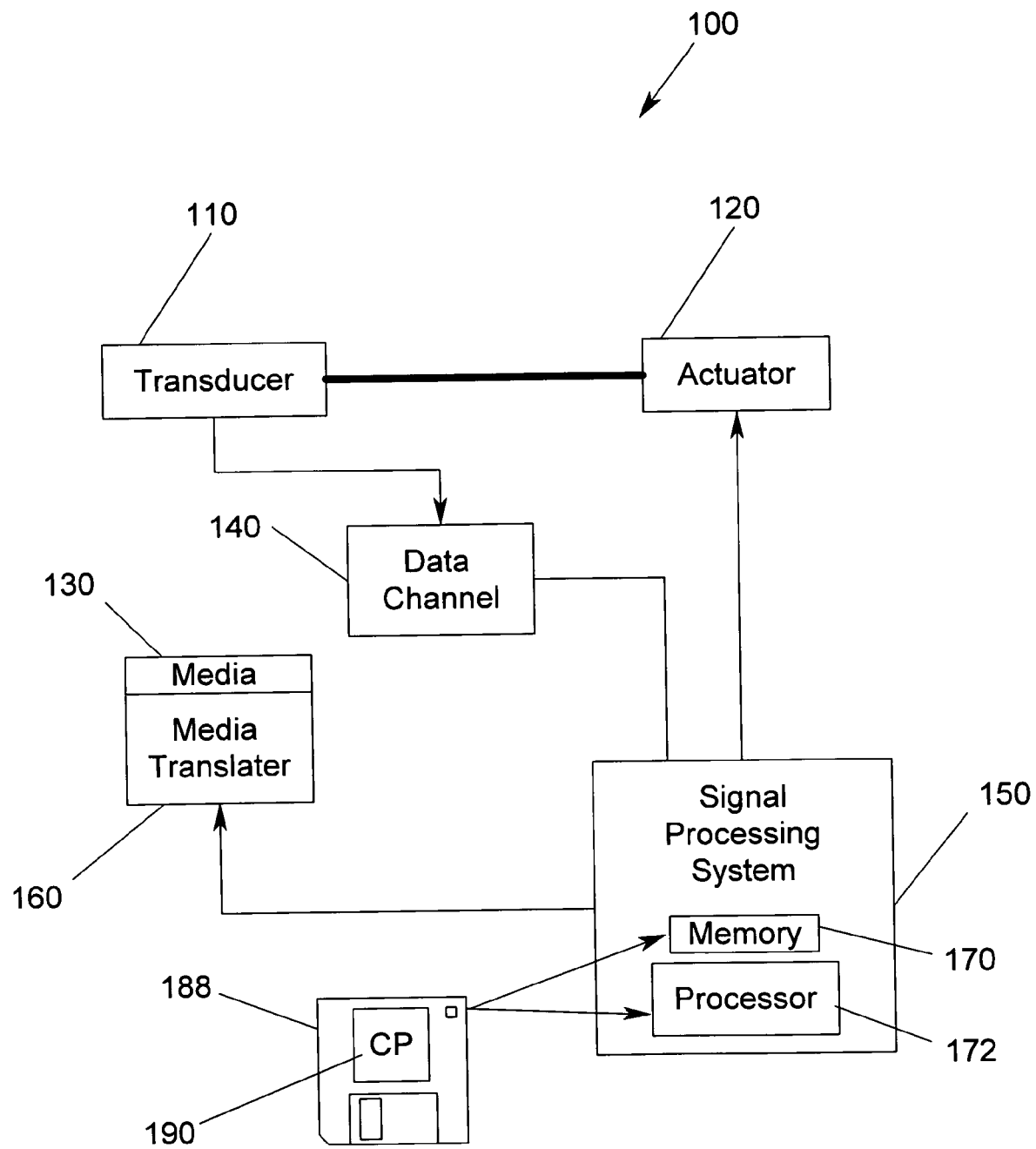
FIG. 1 illustrates a storage system according to an embodiment of the present invention.

FIG. 1 illustrates a storage system 100 according to an embodiment of the present invention. In FIG. 1, a transducer 110 is under control of an actuator 120. The actuator 120 controls the position of the transducer 110. The transducer 110 writes and reads data on magnetic media 130. The read/write signals are passed to a data channel 140. A signal processor system 150 controls the actuator 120 and processes the signals of the data channel 140. In addition, a media translator 160 is controlled by the signal processor system 150 to cause the magnetic media 130 to move relative to the transducer 110. Nevertheless, the present invention is not meant to be limited to a particular type of storage system 100 or to the type of media 130 used in the storage system 100.

Figure 2:
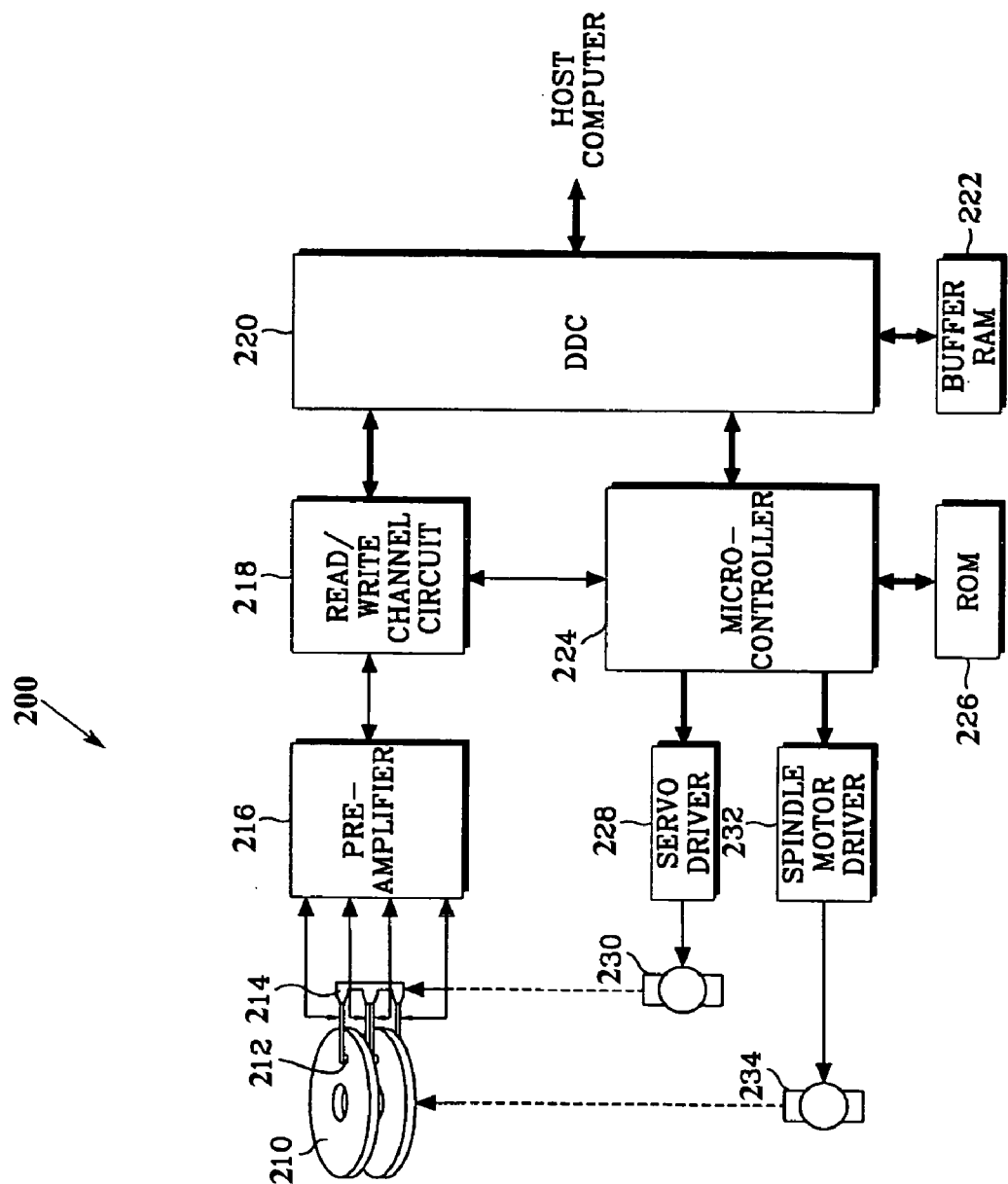
FIG. 2 is a block diagram of a magnetic disk drive device according to an embodiment of the present invention.

FIG. 2 is a block diagram of a magnetic disk drive device 200 according to an embodiment of the present invention. In FIG. 2, disks 210 are rotated by a spindle motor 234, and heads 212 are positioned at surfaces of corresponding ones of disks 210. Heads 212 are mounted on corresponding servo arms that extend from an E-shaped block assembly 214 to disks 210. Block assembly 214 has an associated rotary voice coil actuator 230 that moves block assembly 214 and thereby changes to positions of heads 212 for reading data from or writing data to a specified position on one or more of disks 210.

A pre-amplifier 216 pre-amplifies a signal picked up by heads 212 and thereby provides read/write channel circuit 218 with an amplified signal during a reading operation. During a write operation, pre-amplifier 216 transfers an encoded write data signal from the read/write channel circuit 218 to heads 212. In a read operation, read/write channel circuit 218 detects a data pulse from a read signal provided by pre-amplifier 216 and decodes the data pulse. Read/write channel circuit 218 transfers the decoded data pulse to a disk data controller (DDC) 220. Furthermore, read/write channel circuit 218 also decodes write data received from the DDC 220 and provides the decoded data to pre-amplifier 216.

DDC 220 both writes data received from a host computer (not shown) onto disks 210, through read/write channel circuit 218 and pre-amplifier 216, and transfers read data from disks 210 to the host computer. DDC 220 also interfaces between the host computer and a microcontroller 224. A buffer RAM (Random Access Memory) 222 temporarily stores data transferred between DDC 220 and the host computer, microcontroller 224, and read/write channel circuit 218. Microcontroller 224 controls track seeking and track following functions in response to read and write commands from the host computer.

A ROM (Read Only Memory) 226 stores a control program for microcontroller 224 as well as various setting values. A servo driver 228 generates a driving current for driving actuator 230 in response to a control signal, generated from microcontroller 224 that provides control of the position of heads 212. The driving current is applied to a voice coil of actuator 230. Actuator 230 positions heads 212 relative to disks 210 in accordance with the direction and amount of the driving current supplied from servo driver 228. A spindle motor driver 232 drives spindle motor 234, which rotates disks 210, in accordance with a control value generated from microcontroller 224 for controlling disks 210.

Figure 3:
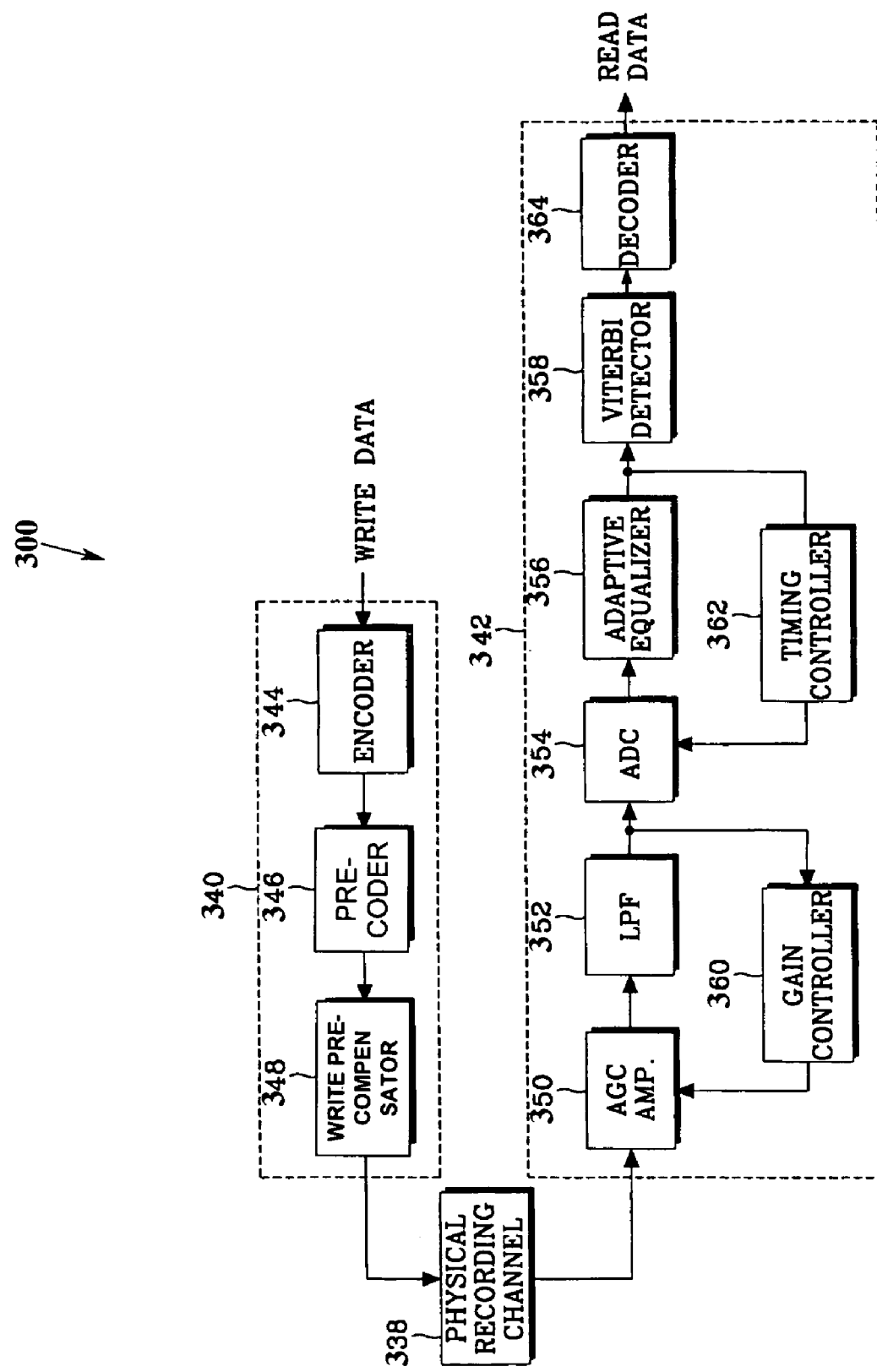
FIG. 3 is a block diagram of a read/write channel circuit of FIG. 2 that employs PRML detection.

FIG. 3 is a block diagram of a read/write channel circuit 300 of FIG. 2 that employs PRML detection. In FIG. 3, the read/write channel circuit 300 includes a physical recording channel 338 having a read/write means and a recording medium, a write channel circuit 340 for writing data onto the recording medium, and a read channel circuit 342 for reading data from the recording medium. Write channel circuit 340 is composed of an encoder 344, a precoder 346, and a write pre-compensator 348. Read channel circuit 342 is composed of an automatic gain control (AGC) amplifier 350, a low pass filter (LPF) 352, an analog-to-digital converter (ADC) 354, an adaptive equalizer 356, a Viterbi detector 358, a gain controller 360, a timing controller 362, and a decoder 364. The Viterbi detector 358 includes a matched filter (not shown in FIG. 3).

In operation, encoder 344 encodes write data, input to be written onto the recording medium, into a predetermined code. For example, an RLL (Run Length Limited) code, in which the number of adjacent zeros must remain between specified maximum and minimum values, is commonly used for this predetermined code. However, the present invention is not meant to be limited to RLL and other coding may be used. Pre-coder 346 is included to prevent error propagation. Write pre-compensator 348 reduces non-linear influences arising from the read/write head. However, because the response of the actual recording channel does not exactly coincide with this transfer function, some subsequent equalization is always required.

Automatic gain control (AGC) amplifier 350 amplifies an analog signal read from the disk. Low pass filter 352 removes high frequency noise from and reshapes the signal output from AGC amplifier 350. The signal output from low pass filter 352 is converted into a discrete digital signal by analog-to-digital (A/D) converter 354. The resulting digital signal is then applied to adaptive equalizer 356, which adaptively controls inter-symbol interference (ISI) to generate desired waveforms. Viterbi detector 358 receives the equalized signal output from adaptive equalizer 356 and from it generates encoded data. Decoder 364 decodes the encoded data output from Viterbi detector 358 to generate the final read data. At the same time, in order to correct the analog signal envelope and the digitization sample timing, gain controller 360 controls the gain of AGC amplifier 350 and timing controller 362 controls sample timing for A/D converter 354.

Figure 4:
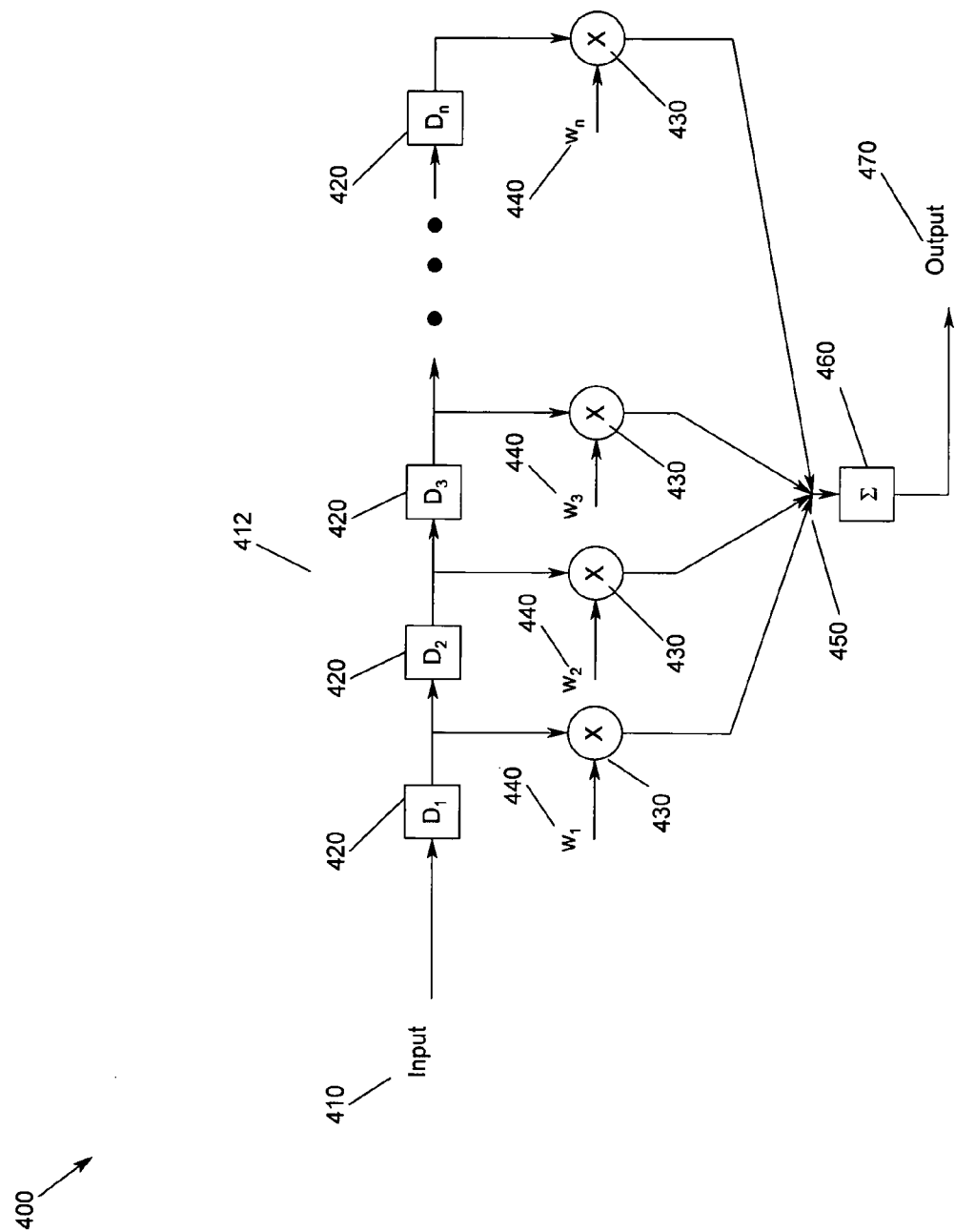
FIG. 4 illustrates an equalizer according to an embodiment of the present invention.

FIG. 4 illustrates an equalizer 400 according to an embodiment of the present invention. In FIG. 4, an input signal 410 is fed into a shift register circuit 412. With each successive input to the shift register, the values of the memory elements 420 are tapped off. The tapped signals may be multiplied 430 by selected coefficients 440. The resulting tapped signals 450 are then added 460 to provide an output 470.

Figure 5:
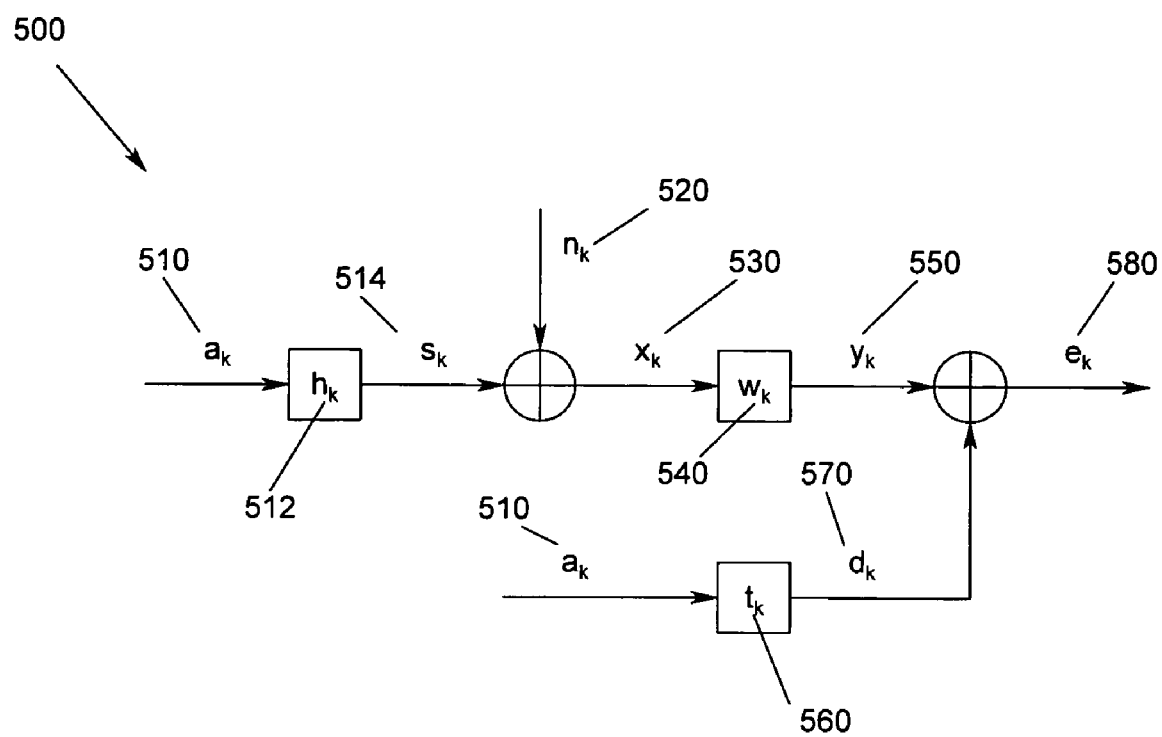
FIG. 5 is a functional block diagram showing the signals at each step of an equalizer according to an embodiment of the present invention.

FIG. 5 is a functional block diagram showing the signals at each step of an equalizer 500 according to an embodiment of the present invention. In FIG. 5, the written bits that are to be detected, $a_k$ 510, are provided at an input. When reading back the bits from a recording media, for example, each logical "1" will produce a dibit response, i.e., two overlapping Lorentzian-like pulses of opposite polarity, whereas a logical "0" produces no output at all. In FIG. 5, $h_k$ 512 represents the system dibit response. Thus, $s_k$ 514 is the noiseless read back signal. The noiseless read back signal, $s_k$ 514, is combined with the noise corrupting read back signal, $n_k$ 520, resulting in a noisy read back signal, $x_k$ 530. The noisy read back signal, $x_k$ 530, is adjusted by DFIR filter tap weights, $w_k$ 540, to produce a noisy equalized read back signal, $y_k$ 550. A desired noiseless signal, $d_k$ 570, which is derived from the written bits that are to be detected, $a_k$ 510, and the target response, $t_k$ 560, e.g., $(t_k,t_{k-1},t_{k-2})=(1, 0,-1)$ for PR4. The difference between the noisy equalized read back signal, $y_k$ 550, and the desired noiseless signal, $d_k$ 570, is an error signal, $e_k$ 580, given by $y_k$-$d_k$.

The DFIR filter tap weights, $w_k$ 540, are updated according to an update algorithm given by $w_i=w_i-g*f(a_{k-i})*e_k$, where g is the update attenuation gain and f( ) is a function, which is described herein below. As described earlier, a direct method for determining the DFIR filter tap weights 540 is to write a known pattern to the disk, read the pattern back, deconvolve out the written pattern to obtain the system response, and then directly solve the resulting system of equations for the equalizer tap weights 540. This approach requires first writing a known pattern to the disk. More typically, the LMS algorithm, which is given by $w_i=w_i-g*x_{k-i}*e_k$, is used for updating the DFIR filter tap weights 540. In an LMS equalizer, the equalizer filter coefficients are chosen to minimize the mean square error, i.e., the sum of squares of all the ISI terms plus the noise power at the output of the equalizer. However, the convergence speed for the LMS equalizer is relatively low, and bandwidth will be consumed for the training sequence. Further, the LMS solution does not converge to the same solution as the direct method.

Figure 6:
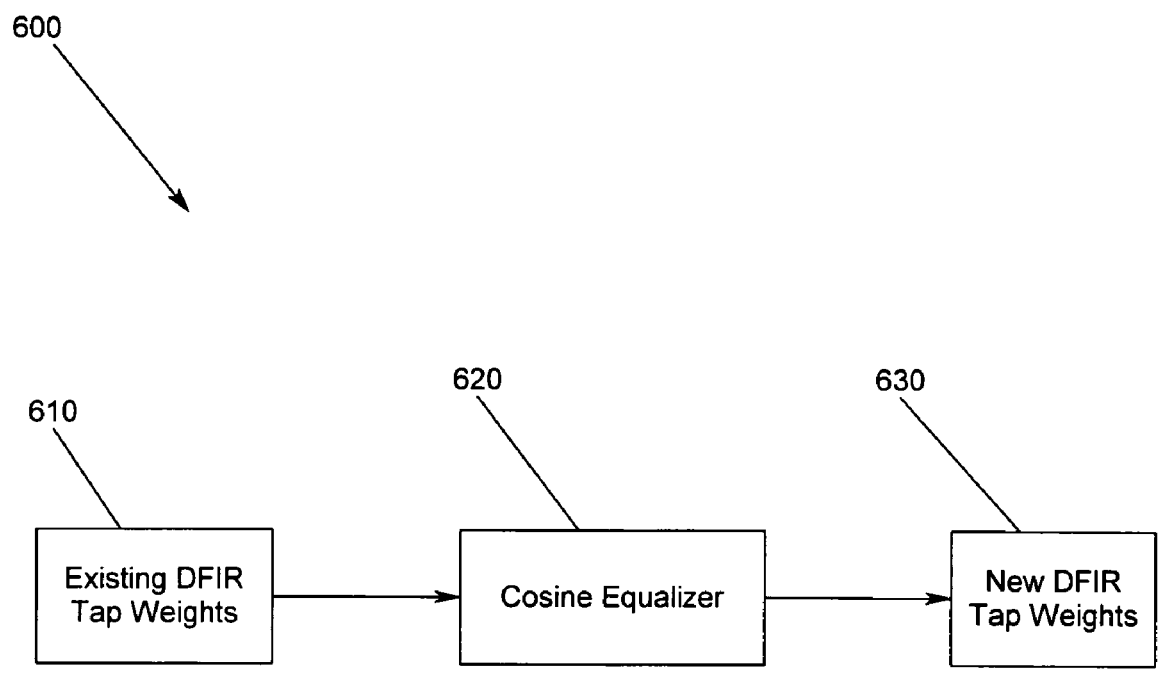
FIG. 6 illustrates a block diagram of a system for updating the tap weights according to an embodiment of the present invention.

FIG. 6 illustrates a block diagram of a system 600 for updating the tap weights of the DFIR filter according to an embodiment of the present invention. In FIG. 6, existing DFIR tap weights 610 are applied to a cosine equalizer 620 having predetermined parameters to provide new DFIR tap weights 630. The parameters will be discussed below.

The cosine equalizer 620 is advantageous when a reasonable set of starting DFIR taps already exist (obtained, for example, in manufacturing) and only some amount of tuning is needed, e.g., to compensate for fly height variation, temperature variation, etc. The cosine equalizer 620 is beneficial not only for adaptively changing equalizer taps to improve overall error rate, but also as a fast data recovery procedure. The cosine equalizer 630 converges towards the same solution as the direct method described above without having to first write a known pattern to the disk or requiring any prior knowledge of the data already written on the disk.

The cosine equalizer 630 can be used to read back whatever unknown existing customer data happens to be on the disk. This turns out to be a profound advantage in certain data recovery situations. Consider, for example, data written at a cold temperature now being read back at a hot temperature. The effective bit density as seen by the read channel changes considerably due to the temperature swing thereby affecting the required optimum equalizer tap settings. These changes are automatically taken into account in having an algorithm that operates directly on the sector being recovered. There would be great difficulty in attempting to mimic the write temperature for each sector when using an algorithm first requiring the writing of a known data pattern.

Figure 7:
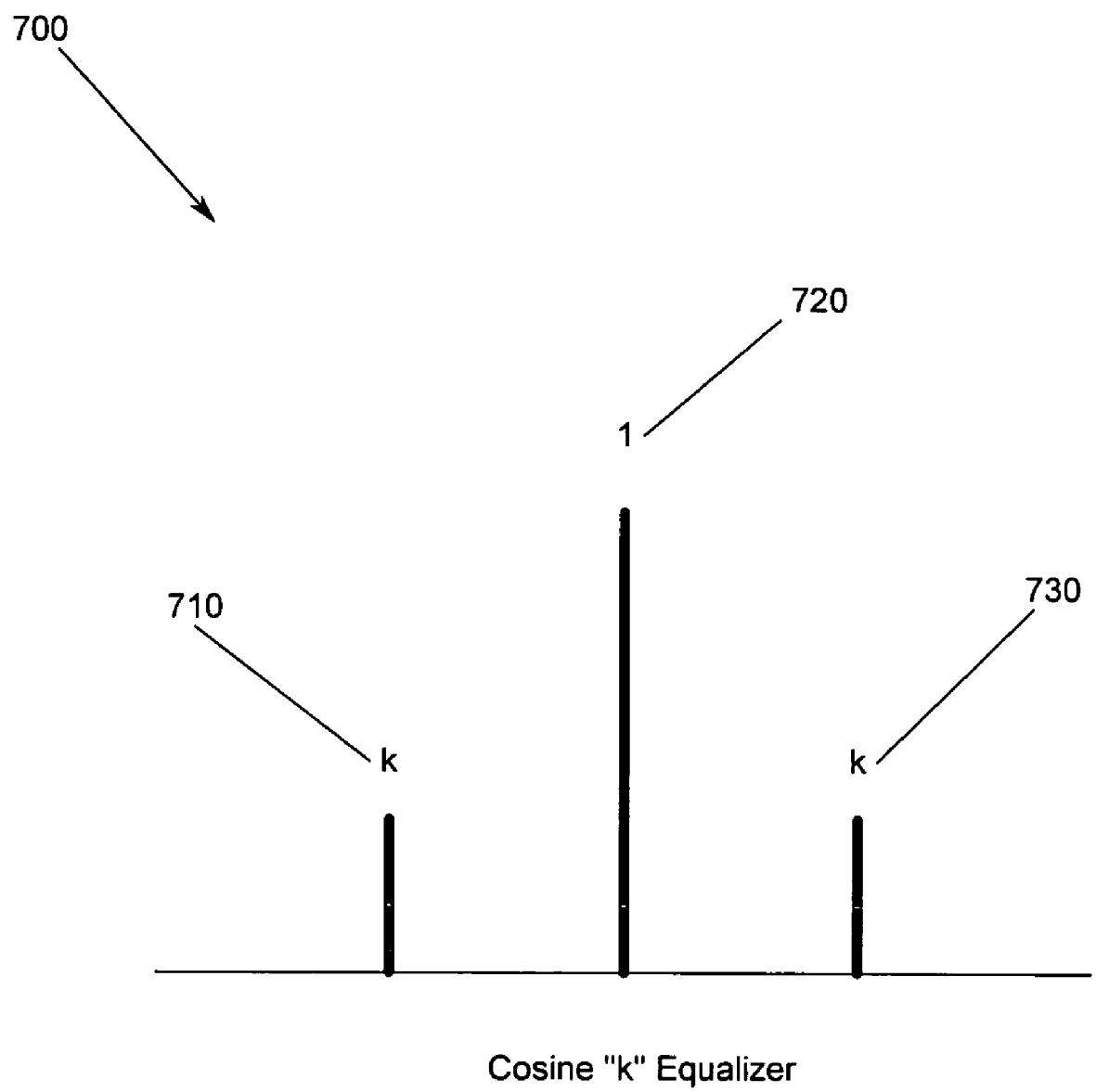
FIG. 7 is a diagram showing the k cosine function according to an embodiment of the present invention.

FIG. 7 is a diagram 700 showing the k cosine function according to an embodiment of the present invention. The cosine equalizer diagram 700 of FIG. 7 includes a single parameter, k, for adjusting the magnitude response. In FIG.

7, the cosine equalizer is represented by k 710, l 720, k 730, wherein k is the k is the cosine equalizer parameter. Accordingly, if a 4-tap DFIR is provided with existing taps: $w_1$, $w_2$, $w_3$, $w_4$, then the DFIR tap weights for the cosine equalizer 700 are given by $w_1+kw_2$, $kw_1+w_2+kw_3$, $kw_2+w_3+kw_4$, $kw_3+w_4$. Truncation is used because when you star with N taps, the convolution using the k parameters yield N+2 taps, and thus the final result is truncated back to N taps by dropping the first and last two values.

Figure 8:
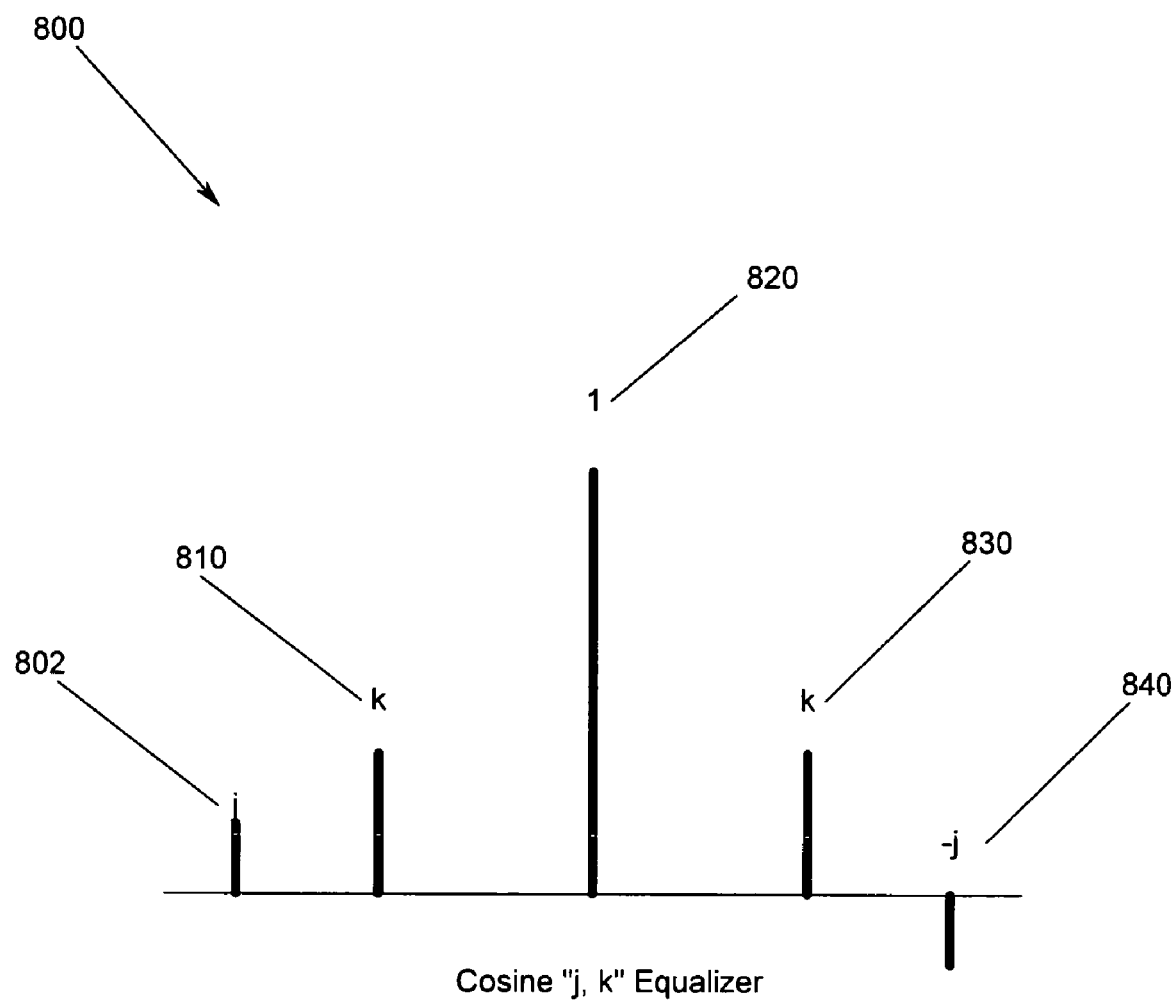
FIG. 8 is a diagram showing the j, k cosine function according to an embodiment of the present invention.

FIG. 8 is a diagram 800 showing the j, k cosine function according to another embodiment of the present invention. The cosine equalizer diagram 800 of FIG. 8 includes a parameter, k, for adjusting the magnitude response and a parameter, j, for adjusting the phase response. In FIG. 8, the cosine equalizer is represented by j 802, +k 810, l 820, +k 830, −j 840, wherein k is the k is the cosine equalizer parameter for adjusting the magnitude response and j is the cosine equalizer parameter for adjusting the phase response. Truncation is used because when you start with N taps, the convolution using the j, k parameters yield N+4 taps, and thus the final result is truncated back to N taps by dropping the first and last two values.

Figure 9:
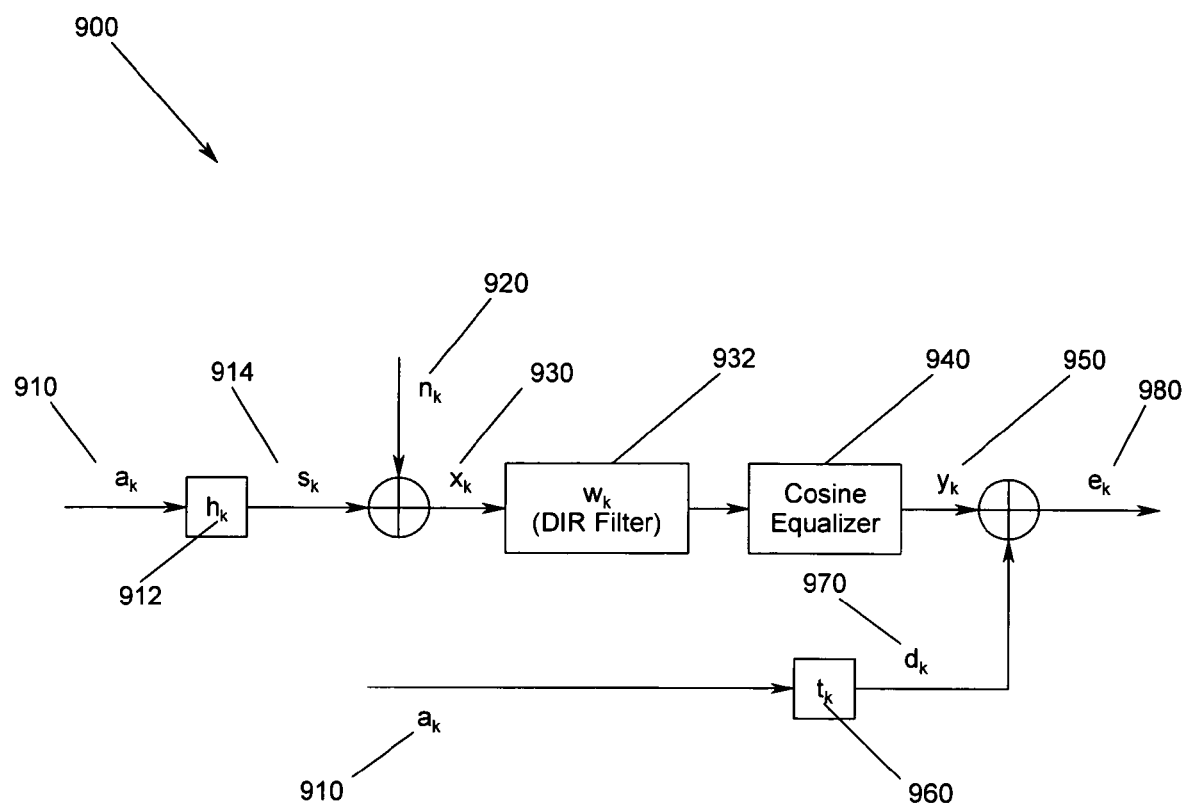
FIG. 9 is a functional block diagram showing the signals at each step of an equalizer according to an embodiment of the present invention.

FIG. 9 is a functional block diagram showing the signals at each step of an equalizer 900 according to an embodiment of the present invention. In FIG. 9, the written bits that are to be detected, $a_k$ 910, are provided at an input. When reading back the bits from a recording media, for example, each logical "1" will produce a dibit response, i.e., two overlapping Lorentzian-like pulses of opposite polarity, whereas a logical "0" produces no output at all. In FIG. 9, $h_k$ 912 represents the system dibit response. Thus, $s_k$ 914 is the noiseless read back signal. The noiseless read back signal, $s_k$ 914, is combined with the noise corrupting read back signal, $n_k$ 920, resulting in a noisy read back signal, $x_k$ 930. The noisy read back signal, $x_k$ 930, is adjusted by DFIR filter 932 and cosine equalizer 940. The cosine equalizer 940 produces the noisy equalized read back signal, $y_k$ 950. A desired noiseless signal, $d_k$ 970 is derived from the written bits that are to be detected, $a_k$ 910, and the target response, $t_k$ 960. Again, the difference between the noisy equalized read back signal, $y_k$ 950, and the desired noiseless signal, $d_k$ 970, is an error signal, $e_k$ 980, given by $y_k-d_k$. However, the tap weights of the DFIR filter 932 and/or the tap weights of the cosine equalizer 940 are updated using the error signal, $e_k$ 980 and the cosine algorithm.

For example, the adaptive cosine function may be used to modify only a DFIR tap set 932. Another algorithm, such as the LMS algorithm, may be used to modify j and k for the cosine equalizer 940. Alternatively, the adaptive cosine function may be used to modify only the j and k parameters of the cosine equalizer. As above, another algorithm, such as the LMS algorithm, may be used to modify the tap set for the DFIR filter 932. Still further, the adaptive cosine function may be used to modify both the tap set for the DFIR filter 932 and the j and k parameters of the cosine equalizer 940.

Using only the parameter for modifying the magnitude response, the tap weights of the DFIR filter 932 are updated according to $w_i = w_i - g*f(a_{k-i})*e_k$, where g is the update attenuation gain and f( ) is based on the selected cosine function. Thus, when compared to the LMS algorithm, the cosine equalizer provides a modified tap update equation to replace $x_{k-i}$ with $f(a_{k-i})$. However, as described above, a parameter, j, may be included for modifying the phase also.

Figure 10:
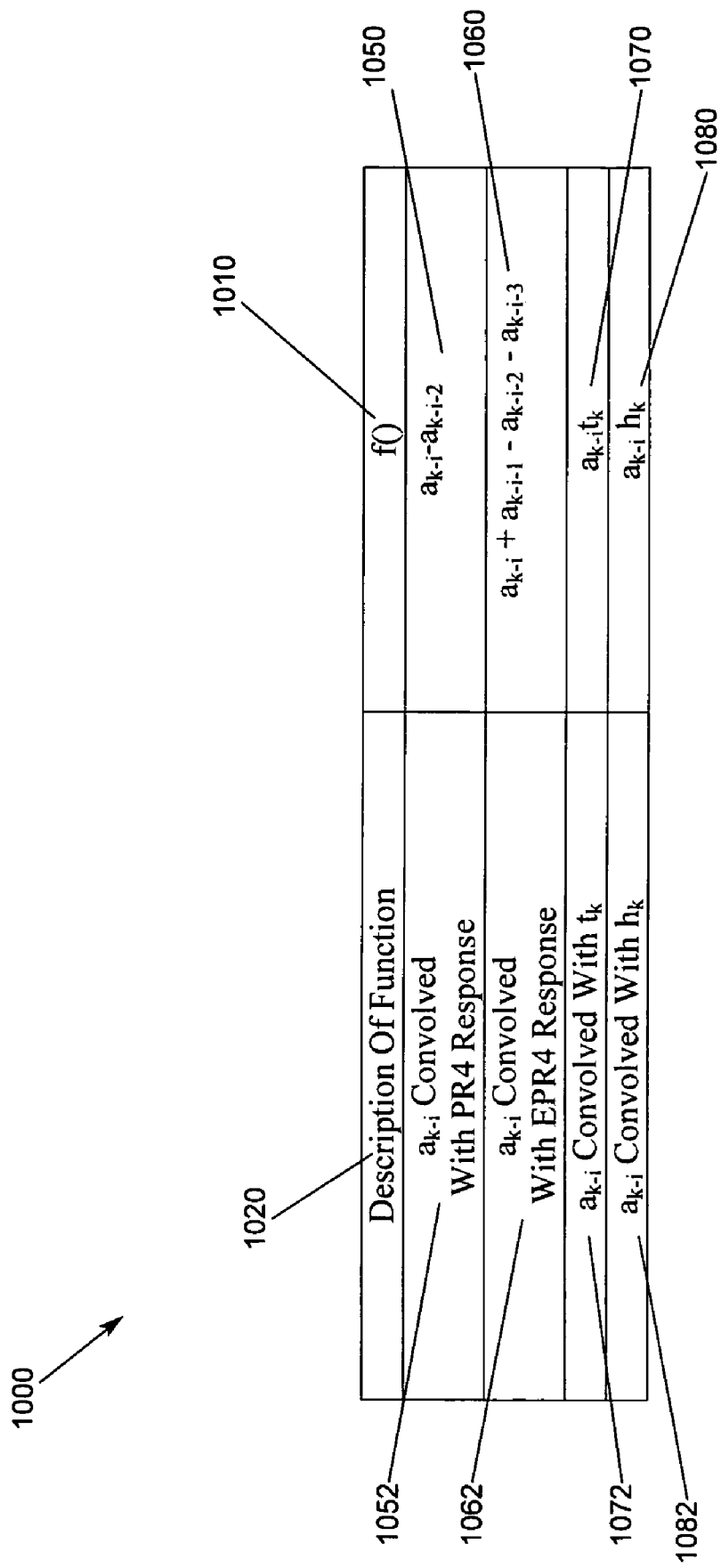
FIG. 10 illustrates a chart of the functions for the cosine equalizer according to the present invention.

FIG. 10 illustrates a chart 1000 of the functions, f( ) 1010, for the cosine equalizer according to the present invention. FIG. 10 shows a description of the functions 1020 and the functions 1010. According to FIG. 10, $f(a_{k-i})$ could be chosen to be $a_{k-i}-a_{k-i-2}$ 1050, which has $a_{k-i}$ convolved with PR4 response 1052. Alternatively, $f(a_{k-i})$ could be chosen to be equal to $a_{k-i}+a_{k-i-1}-a_{k-i-2}-a_{k-i-3}$ 1060, wherein $a_{k-i}$ is convolved with the EPR4 response 1062. Still further, $f(a_{k-i})$ could be chosen to be equal to $a_{k-i}t_k$ 1070, wherein $a_{k-i}$ is convolved with $t_k$ 1072 or chosen to be $a_{k-i}h_k$ 1080, wherein $a_{k-i}$ is convolved with $h_k$ 1082.

For each of these embodiments discussed above, the tap update algorithm for modifying the magnitude response is $k=k-g*(f(a_{k+1})+f(a_{k-1}))*e_k$. For example, when $f(a_k)=a_k-a_{k-2}$ 1050 as is the case for the PR4 response 1052, the update becomes $k=k-g*(a_{k+1}-a_{k-3})*e_k$. When $f(a_k)$ is equal to $a_{k-i}+a_{k-i-1}-a_{k-i-2}-a_{k-i-3}$ 1060 as is the case for the EPR4 response 1062, the update becomes $k=k-g*(a_{k+1}+a_k-a_{k-3}-a_{k-4})*e_k$. When $f(a_k)=a_{k-i}t_k$ 1070, the update becomes $k=k-g*(a_{k+1}t_{k+1}+a_{k-1}t_{k-1})*e_k$. When $f(a_k)=a_{k-i}h_k$ 1080, the update becomes $k=k-g*(a_{k+1}h_{k+1}+a_{k-1}h_{k-1})*e_k$. Accordingly, one skilled in the art will recognize that these principles may be extended to other types of filters, such as $E^2PR4$ filters.

Also, for each of the embodiments discussed above, the tap update algorithm for modifying the phase response is $j=j-g*(f(a_{k+2})+f(a_{k-2}))*e_k$. For example, when $f(a_k)=a_k-a_{k-2}$ 1050 as is the case for the PR4 response 1052, the update becomes $j=j-g*(a_{k+2}-a_k+a_{k-2}-a_{k-4})*e_k$. The j updates for $a_{k-i}$ convolved with EPR4 response, for $a_{k-i}$ convolved with $t_k$ (the target response) and for $a_{k-i}$ convolved with $h_k$ (the dibit response), etc., may also be derived in the same fashion.

The coefficient update loop according to an embodiment of the present invention uses the cosine algorithm. The frequency response for an ideal cosine algorithm comprises a cosine function at low frequencies, and total attenuation at high frequencies. However, the present invention is not meant to be limited strictly to the cosine algorithm for updating tap coefficients. An adaptive filter according to another embodiment of the present invention may be implemented using a raised cosine algorithm. The frequency response for an ideal raised cosine algorithm comprises unity gain at low frequencies, a raised cosine function in the middle, and total attenuation at high frequencies. The width of the middle frequencies are defined by the roll off factor constant Alpha, $\alpha$, wherein $0<\alpha<1$.

The cosine equalizer according to embodiments of the present invention provides magnitude adjustment with linear phase without modifying the gain or phase response of the DFIR at the preamble pattern frequency, i.e., 0.25T sync pattern. This property can be important for maintaining the integrity of timing and gain recovery loops.

Figure 11:
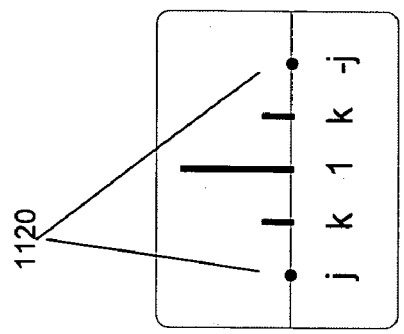
FIG. 11 illustrates the magnitude and phase graphed against the normalized frequency for the cosine equalizer having the j parameter set to zero according to an embodiment of the present invention.
Figure 11:
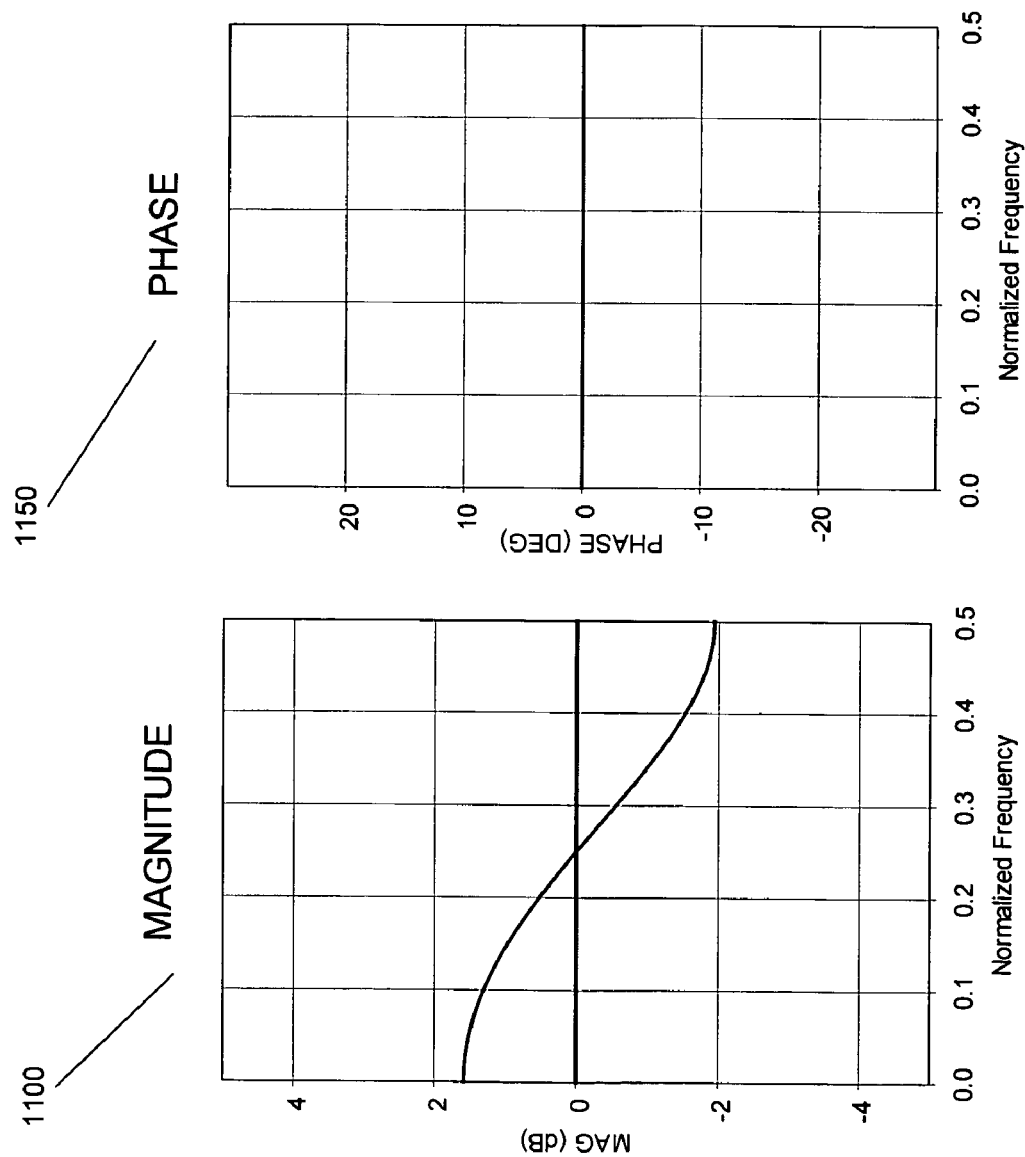

FIG. 11 illustrates the magnitude 1100 and phase 1150 graphed against the normalized frequency for the cosine equalizer having the j parameter 1120 set to zero according to an embodiment of the present invention.

Figure 12:
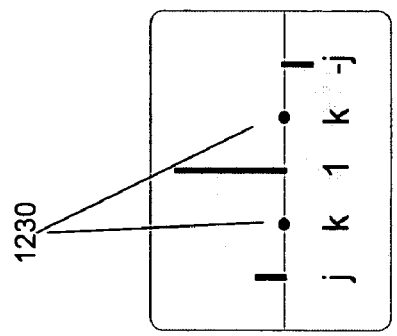
FIG. 12 illustrates the magnitude and phase graphed against the normalized frequency for the cosine equalizer having the k parameter set to zero according to an embodiment of the present invention.
Figure 12:
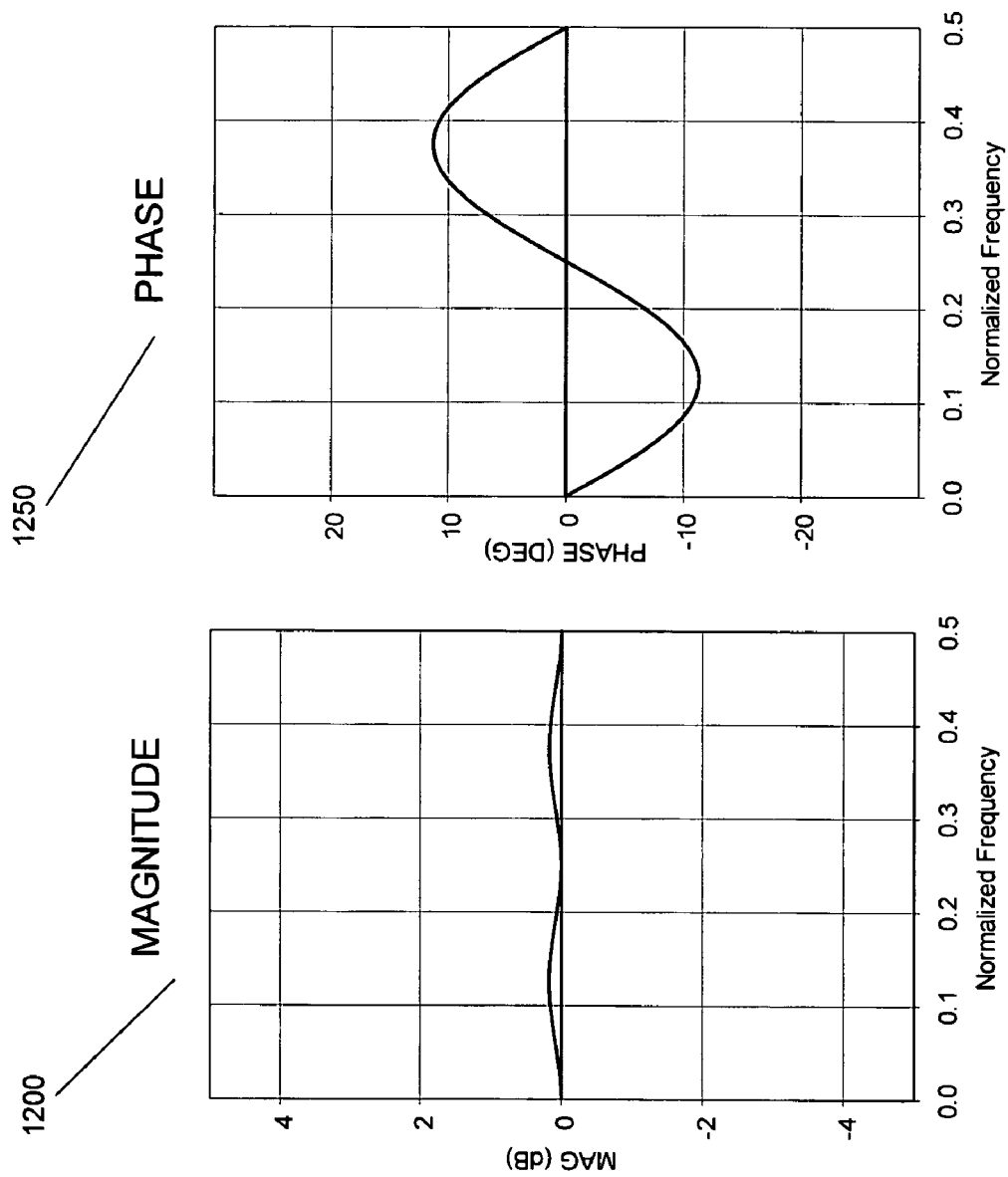

FIG. 12 illustrates the magnitude 1200 and phase 1250 graphed against the normalized frequency for the cosine equalizer having the k parameter 1230 set to zero according to an embodiment of the present invention.

The process illustrated with reference to FIGS. 1–12 may be tangibly embodied in a computer-readable medium or carrier, e.g. one or more of the fixed and/or removable data storage devices 188 illustrated in FIG. 1, or other data storage or data communications devices. The computer program 190 may be loaded into memory 170 to configure the processor 172 for execution of the computer program 190. The computer program 190 include instructions which, when read and executed by a processor 172 of FIG. 1, causes the devices to perform the steps necessary to execute the steps or elements of an embodiment of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description.

What is claimed is:

1. A read channel, comprising:
   an equalizer configured to equalize a digital signal to provide equalized reproduced signals; and
   a Viterbi detector capable of receiving the equalized reproduced signals and converting the reproduced signals into a digital output signal indicative of data stored on a recording medium;
   wherein the equalizer is implemented using a coefficient learning circuit that adaptively updates coefficients for the equalizer based upon a cosine function, the coefficient learning circuit adjusting coefficients using a tap coefficient update equation having a first parameter, k, for modifying a magnitude response, wherein the first parameter, k, is adjusted according to $k=k-g*(f(a_{k+1})+f(a_{k-1}))*e_k$, wherein k is the cosine equalizer parameter for modifying the magnitude response, g is an update attenuation gain, f( ) is a predetermined cosine function, $a_{k+1}$ represents a bit to be detected at time k+1, $a_{k-1}$ represents a bit to be detected at time k−1, and $e_k$ is an error signal based on a difference between a noisy equalized signal and a desired noiseless signal.

2. The read channel of claim 1, wherein the coefficient learning circuit adjusts coefficients using a tap coefficient update equation having a second parameter, j, for modifying a phase response.

3. The read channel of claim 2, wherein the second parameter, j, is adjusted according to $j=j-g*(f(a_{k+2})+f(a_{k-2}))*e_k$, where j is the cosine equalizer parameter for modifying the phase response, g is an update attenuation gain, f( ) is a predetermined cosine function, $a_{k+2}$ represents a bit to be detected at time k+2, $a_{k-2}$ represents a bit to be detected at time k−2, and $e_k$ is an error signal based on a difference between a noisy equalized signal and a desired noiseless signal.

4. A read channel, comprising:
   an equalizer configured to equalize a digital signal to provide equalized reproduced signals; and
   a Viterbi detector capable of receiving the equalized reproduced signals and converting the reproduced signals into a digital output signal indicative of data stored on a recording medium;
   wherein the equalizer is implemented using a coefficient learning circuit that adaptively updates coefficients for the equalizer based upon a cosine function, wherein the coefficient learning circuit adjusts coefficients, $w_i$, according to $w_i=w_i-g*f(a_{k-i})*e_k$, where g is a provided update attenuation gain and f( ) is a predetermined cosine function and $a_{k-i}$ represents a bit to be detected at time k−i.

5. The read channel of claim 4, wherein $f(a_{k-i})$ is chosen to be $a_{k-i}-a_{k-i-2}$, wherein written bits that are to be detected, $a_{k-i}$, are convolved with a PR4 response based upon the cosine function.

6. The read channel of claim 4, wherein $f(a_{k-i})$ is chosen to be $a_{k-i}+a_{k-i-1}-a_{k-i-2}-a_{k-i-3}$, wherein written bits that are to be detected, $a_{k-i}$, are convolved with the EPR4 response based upon the cosine function.

7. The read channel of claim 4, wherein $f(a_{k-i})$ is chosen to be $a_{k-i}t_k$, wherein written bits that are to be detected, $a_{k-i}$, are convolved with $t_k$ based upon the cosine function.

8. The read channel of claim 4, wherein $f(a_{k-i})$ is chosen to be $a_{k-i}h_k$, wherein written bits that are to be detected, $a_{k-i}$, are convolved with $h_k$ based upon the cosine function.

9. A waveform equalizer that equalizes a waveform of a reproduction signal obtained by reproducing marks and non-marks recorded on a recording medium, comprising:
   a delay element that delays a propagation of the reproduced signal;
   a plurality of multipliers that multiply predetermined coefficients by the reproduction signal and the delayed signal from the delay element;
   a coefficient learning circuit that adaptively updates the predetermined coefficients for each of the plurality of multipliers; and
   an adder that adds outputs from the plurality of multipliers;
   wherein the coefficient learning circuit adaptively updates coefficients for the equalizer based upon a cosine function, the coefficient learning circuit adjusting coefficients using a tap coefficient update equation having a first parameter, k, for modifying a magnitude response, wherein the first parameter, k, is adjusted according to $k=k-g*(f(a_{k+1})+f(a_{k-1}))*e_k$, where k is the cosine equalizer parameter for modifying the magnitude response, g is an update attenuation gain, f( ) is a predetermined cosine function, $a_{k+1}$ represents a bit to be detected at time k+1, $a_{k-1}$ represents a bit to be detected at time k−1, and $e_k$ is an error signal based on a difference between a noisy equalized signal and a desired noiseless signal.

10. The waveform equalizer of claim 9, wherein the coefficient learning circuit adjusts coefficients using a tap coefficient update equation having a second parameter, j, for modifying a phase response.

11. The waveform equalizer of claim 10, wherein the second parameter, j, is adjusted according to $j=j-g*(f(a_{k+2})+f(a_{k-2}))*e_k$, where j is the cosine equalizer parameter for modifying the phase response, g is an update attenuation gain, f( ) is a predetermined cosine function, $a_{k+2}$ represents a bit to be detected at time k+2, $a_{k-2}$ represents a bit to be detected at time k−2, and $e_k$ is an error signal based on a difference between a noisy equalized signal and a desired noiseless signal.

12. A waveform equalizer that equalizes a waveform of a reproduction signal obtained by reproducing marks and non-marks recorded on a recording medium, comprising:
   a delay element that delays a propagation of the reproduced signal;
   a plurality of multipliers that multiply predetermined coefficients by the reproduction signal and the delayed signal from the delay element;
   a coefficient learning circuit that adaptively updates the predetermined coefficients for each of the plurality of multipliers; and
   an adder that adds outputs from the plurality of multipliers;
   wherein the coefficient learning circuit adaptively updates coefficients for the equalizer based upon a cosine function, wherein the coefficient learning circuit adjusts coefficients, $w_i$, according to $w_i=w_i-g*f(a_{k-i})*e_k$, where g is a provided update attenuation gain gain and f( ) is a predetermined cosine function and $a_{k-i}$ represents a bit to be detected at time k−i.

13. The waveform equalizer of claim 12, wherein $f(a_{k-i})$ is chosen to be $a_{k-i}-a_{k-i-2}$, wherein written bits that are to be detected, $a_{k-i}$, are convolved with a PR4 response based upon the cosine function.

14. The waveform equalizer of claim 12, wherein $f(a_{k-i})$ is chosen to be $a_{k-i}+a_{k-i-1}-a_{k-i-2}-a_{k-i-3}$, wherein written bits that are to be detected, $a_{k-i}$, are convolved with the EPR4 response based upon the cosine function.

15. The waveform equalizer of claim 12, wherein $f(a_{k-i})$ is chosen to be $a_{k-i}t_k$, wherein written bits that are to be detected, $a_{k-i}$, are convolved with $t_k$ based upon the cosine function.

16. The waveform equalizer of claim 12, wherein $f(a_{k-i})$ is chosen to be $a_{k-i}h_k$, wherein written bits that are to be detected, $a_{k-i}$, are convolved with $h_k$ based upon the cosine function.

17. A signal processing system, comprising:
memory for storing data therein; and
a processor, coupled to the memory, for equalizing a digital signal to provide equalized reproduced signals, the processor adaptively updates coefficients for the equalizer based upon a cosine function, the processor adjusting coefficients using a tap coefficient update equation having a first parameter, k, for modifying a magnitude response, wherein the first parameter, k, is adjusted according to $k=k-g*(f(a_{k+1})+f(a_{k-1}))*e_k$, where k is the cosine equalizer parameter for modifying the magnitude response, g is an update attenuation gain, $f(\ )$ is a predetermined cosine function, $a_{k+1}$ represents a bit to be detected at time k+1, $a_{k-1}$ represents a bit to be detected at time k−1, and $e_k$ is an error signal based on a difference between a noisy equalized signal and a desired noiseless signal.

18. The signal processing system of claim 17, wherein the processor adjusts coefficients using a tap coefficient update equation having a second parameter, j, for modifying a phase response.

19. The signal processing system of claim 18, wherein the second parameter, j, is adjusted according to $j=j-g*(f(a_{k+2})+f(a_{k-2}))*e_k$, where j is the cosine equalizer parameter for modifying the phase response, g is an update attenuation gain, $f(\ )$ is a predetermined cosine function, $a_{k+2}$ represents a bit to be detected at time k+2, $a_{k-2}$ represents a bit to be detected at time k−2, and $e_k$ is an error signal based on a difference between a noisy equalized signal and a desired noiseless signal.

20. A signal processing system, comprising:
memory for storing data therein; and
a processor, coupled to the memory, for equalizing a digital signal to provide equalized reproduced signals, the processor adaptively updates coefficients for the equalizer based upon a cosine function, wherein the coefficient learning circuit adjusts coefficients, $w_i$, according to $w_i=w_i-g*f(a_{k-i})*e_k$, where g is a provided update attenuation gain and $f(\ )$ is a predetermined cosine function and $a_{k-i}$ represents a bit to be detected at time k−i.

21. The signal processing system of claim 20, wherein $f(a_{k-i})$ is chosen to be $a_{k-i}-a_{k-i-2}$, wherein written bits that are to be detected, $a_{k-i}$, are convolved with a PR4 response based upon the cosine function.

22. The signal processing system of claim 20, wherein $f(a_{k-i})$ is chosen to be $a_{k-i}+a_{k-i-1}-a_{k-i-2}-a_{k-i-3}$, wherein written bits that are to be detected, $a_{k-i}$, are convolved with the EPR4 response based upon the cosine function.

23. The signal processing system of claim 20, wherein $f(a_{k-i})$ is chosen to be $a_{k-i}t_k$, wherein written bits that are to be detected, $a_{k-i}$, are convolved with $t_k$ based upon the cosine function.

24. The signal processing system of claim 20, wherein $f(a_{k-i})$ is chosen to be $a_{k-i}h_k$, wherein written bits that are to be detected, $a_{k-i}$, are convolved with $h_k$ based upon the cosine function.

25. A magnetic storage device, comprising:
a magnetic storage medium for recording data thereon;
a motor for moving the magnetic storage medium;
a head for reading and writing data on the magnetic storage medium;
an actuator for positioning the head relative to the magnetic storage medium; and
a data channel for processing encoded signals on the magnetic storage medium, the data channel comprising an equalizer configured to equalize a digital signal to provide equalized reproduced signals and a Viterbi detector capable of receiving the equalized reproduced signals and converting the reproduced signals into a digital output signal indicative of data stored on a recording medium; wherein the equalizer is implemented using a coefficient learning circuit that adaptively updates coefficients for the equalizer based upon a cosine function, the equalizer adjusting coefficients using a tap coefficient update equation having a first parameter, k, for modifying a magnitude response, wherein the first parameter, k, is adjusted according to $k=k-g*(f(a_{k+1})+f(a_{k-1}))*e_k$, where k is the cosine equalizer parameter for modifying the magnitude response, g is an update attenuation gain, $f(\ )$ is a predetermined cosine function, $a_{k+1}$ represents a bit to be detected at time k+1, $a_{k-1}$ represents a bit to be detected at time k−1, and $e_k$ is an error signal based on a difference between a noisy equalized signal and a desired noiseless signal.

26. The magnetic storage device of claim 25, wherein the equalizer adjusts coefficients using a tap coefficient update equation having a second parameter, j, for modifying a phase response.

27. The magnetic storage device of claim 26, wherein the second parameter, j, is adjusted according to $j=j-g*(f(a_{k+2})+f(a_{k-2}))*e_k$, where j is the cosine equalizer parameter for modifying the phase response, g is an update attenuation gain, $f(\ )$ is a predetermined cosine function, $a_{k+2}$ represents a bit to be detected at time k+2, $a_{k-2}$ represents a bit to be detected at time k−2, and $e_k$ is an error signal based on a difference between a noisy equalized signal and a desired noiseless signal.

28. A magnetic storage device, comprising:
a magnetic storage medium for recording data thereon;
a motor for moving the magnetic storage medium;
a head for reading and writing data on the magnetic storage medium;
an actuator for positioning the head relative to the magnetic storage medium; and
a data channel for processing encoded signals on the magnetic storage medium, the data channel comprising an equalizer configured to equalize a digital signal to provide equalized reproduced signals and a Viterbi detector capable of receiving the equalized reproduced signals and converting the reproduced signals into a digital output signal indicative of data stored on a recording medium; wherein the equalizer is implemented using a coefficient learning circuit that adaptively updates coefficients for the equalizer based upon a cosine function, wherein the coefficient learning circuit adjusts coefficients, $w_i$, according to $w_i=w_i-g*f$ $(a_{k-i})*e_k$, where g is a provided update attenuation gain and f( ) is a predetermined cosine function and $a_{k-i}$ represents a bit to be detected at time k−i.

29. The magnetic storage device of claim 28, wherein $f(a_{k-i})$ is chosen to be $a_{k-i}-a_{k-i-2}$, wherein written bits that are to be detected, $a_{k-i}$, are convolved with a PR4 response based upon the cosine function.

30. The magnetic storage device of claim 28, wherein $f(a_{k-i})$ is chosen to be $a_{k-i}+a_{k-i-1}-a_{k-i-2}-a_{k-i-3}$, wherein written bits that are to be detected, $a_{k-i}$, are convolved with the EPR4 response based upon the cosine function.

31. The magnetic storage device of claim 28, wherein $f(a_{k-i})$ is chosen to be $a_{k-i}t_k$, wherein written bits that are to be detected, $a_{k-i}$, are convolved with $t_k$ based upon the cosine function.

32. The magnetic storage device of claim 28, wherein $f(a_{k-i})$ is chosen to be $a_{k-i}h_k$, wherein written bits that are to be detected, $a_{k-i}$, are convolved with $h_k$ based upon the cosine function.

* * * * *

UNITED STATES PATENT AND TRADEMARK OFFICE
CERTIFICATE OF CORRECTION

PATENT NO. : 7,193,802 B2  
APPLICATION NO. : 10/809230  
DATED : March 20, 2007  
INVENTOR(S) : Cideciyan et al.

It is certified that error appears in the above-identified patent and that said Letters Patent is hereby corrected as shown below:

Col. 12, Line 28: "gain, f( )" should read -- gain f( ) --
Col. 13, Line 57: "gain and and f( )" should read -- gain and f( ) --
Col. 14, Line 31: "gain, f( )" should read -- gain and f( ) --
Col. 16, Line 2: "$a_k$-$t_k$," should read -- $a_{k-i}t_k$,--

Signed and Sealed this

Twenty-sixth Day of February, 2008

JON W. DUDAS  
*Director of the United States Patent and Trademark Office*